United States Patent
Zoken et al.

(12) United States Patent (10) Patent No.: US 7,324,666 B2
(45) Date of Patent: Jan. 29, 2008

(54) METHODS FOR ASSIGNING GEOCODES TO STREET ADDRESSABLE ENTITIES

(75) Inventors: Jack M. Zoken, San Rafael, CA (US); Prashant P. Devdhar, Cupertino, CA (US)

(73) Assignee: Whitegold Solutions, Inc., Santa Clara, CA (US)

( * ) Notice: Subject to any disclaimer, the term of this patent is extended or adjusted under 35 U.S.C. 154(b) by 755 days.

(21) Appl. No.: 10/715,349

(22) Filed: Nov. 14, 2003

(65) Prior Publication Data

US 2004/0138817 A1    Jul. 15, 2004

Related U.S. Application Data

(60) Provisional application No. 60/426,568, filed on Nov. 15, 2002.

(51) Int. Cl.
G06K 9/00     (2006.01)
G06K 9/34     (2006.01)
G06K 9/46     (2006.01)
G06K 9/66     (2006.01)
G01V 3/38     (2006.01)
G06F 19/00    (2006.01)

(52) U.S. Cl. .................... 382/113; 382/100; 382/173; 382/190; 702/5

(58) Field of Classification Search ............ 382/103, 382/113, 173, 180, 191, 190, 220, 100; 702/2, 702/5, 7, 15, 16; 707/104.1
See application file for complete search history.

(56) References Cited

U.S. PATENT DOCUMENTS

| | | | | |
|---|---|---|---|---|
| 5,265,173 A | * | 11/1993 | Griffin et al. ............... | 382/103 |
| 6,101,496 A | * | 8/2000 | Esposito .................... | 707/6 |
| 6,408,085 B1 | * | 6/2002 | Yuen ......................... | 382/113 |
| 6,934,634 B1 | * | 8/2005 | Ge ............................. | 702/2 |
| 7,046,827 B2 | * | 5/2006 | Chen et al. ................. | 382/113 |
| 7,076,505 B2 | * | 7/2006 | Campbell .................. | 707/104.1 |
| 2001/0051852 A1 | | 12/2001 | Sundravel et al. | |
| 2002/0035432 A1 | * | 3/2002 | Kubica et al. .............. | 702/5 |
| 2002/0152208 A1 | * | 10/2002 | Bloedorn .................... | 707/6 |
| 2003/0140064 A1 | * | 7/2003 | Klein ......................... | 707/104.1 |
| 2003/0158668 A1 | * | 8/2003 | Anderson .................. | 702/5 |
| 2005/0114354 A1 | * | 5/2005 | Singh et al. ................ | 707/10 |
| 2005/0137994 A1 | * | 6/2005 | Fortin et al. ............... | 706/45 |

* cited by examiner

*Primary Examiner*—Samir Ahmed
*Assistant Examiner*—Nathan Bloom
(74) *Attorney, Agent, or Firm*—Lumen Intellectual Property Services, Inc.

(57) ABSTRACT

A method for assigning of geocodes to addresses identifying entities on a street includes ordering a set of entity geocodes associated with a street segment based on ordering criteria such as the linear distance of the geocodes along the length of the street segment. Assignable addresses are matched with the ordered geocodes creating a correspondence between a numerical order of the assignable addresses and a linear order of the ordered set of geocodes, consistent with address range direction data and street segment side data. The geocodes may be implicit or explicit, locally unique or globally unique. The set of entity geocodes may be obtained by identifying image features in aerial imagery corresponding to streets and buildings and correlating this information with data from a street map database.

34 Claims, 6 Drawing Sheets

4512 Greene Avenue  
4516 Greene Avenue  
4520 Greene Avenue  
4524 Greene Avenue  
4530 Greene Avenue  
4534 Greene Avenue  
4538 Greene Avenue  
4540 Greene Avenue  
4544 Greene Avenue  
4548 Greene Avenue  
4552 Greene Avenue  
} Even Addresses 4501 Greene Avenue  
4505 Greene Avenue  
4509 Greene Avenue  
4513 Greene Avenue  
4517 Greene Avenue  
4521 Greene Avenue  
4525 Greene Avenue  
4529 Greene Avenue  
4533 Greene Avenue  
4539 Greene Avenue  
4543 Greene Avenue  
4549 Greene Avenue  
4553 Greene Avenue  
} Odd Addresses

METHODS FOR ASSIGNING GEOCODES TO STREET ADDRESSABLE ENTITIES

CROSS-REFERENCE TO RELATED APPLICATIONS

This application claims priority from U.S. provisional patent application No. 60/426,568 filed Nov. 15, 2002, which is incorporated herein by reference.

FIELD OF THE INVENTION

This invention relates generally to methods for assigning geocodes to entities such as buildings, structures, lots, and other geographical regions which may be identified by street addresses.

BACKGROUND OF THE INVENTION

A geocode is a geographical location associated with an entity such as a building, structure, parcel, lot, or other geographical region. Often such entities are identified by a street address, in which case the entities are called street-addressable entities. Geocoding is the process that associates a specific geographical location, such as a pair of latitude-longitude coordinates, with the street address or other identifier of the entity. Geocodes help in enhancing our understanding of geographic relationships between addressable entities on streets. Such understanding of geographic relationships is critical in many areas, including insurance underwriting, telecommunications DSL loop qualification, route assignment and dispatching, and municipal sales tax, to name a few.

Methods exist for generating highly accurate geocodes. For example, addresses can be individually surveyed with GPS receivers. Another approach involves merging parcels maps into a Geographic Information System. These approaches, however are very expensive and time-consuming to implement on a large scale. Accordingly, less expensive and more efficient geocoding methods have been developed. These approaches, however, often produce inaccurate geocodes. For example, a conventional geocoding method called Address Interpolation estimates geocodes of addresses along an entire street segment using knowledge of geocodes for just the endpoints of the street segment. Address Interpolation assumes that the street segments are relatively straight, have uniformly spaced street addresses, have buildings of fairly uniform size and are set back a fairly uniform distance back from the street. Provided these assumptions are satisfied, Address Interpolation can accurately estimate geocodes for addresses along each street segment from the segment's endpoint information by linear interpolation. Unfortunately, the above assumptions often fail, and the resulting geocodes are inaccurate.

Address Interpolation typically uses a Street Map database, which is a compilation of start and end point locations of each street segment, along with information describing the range of addresses on the street segment. To generate such a database, only the endpoints of street segments need to be geocoded (e.g., by surveying). The technique is therefore much less expensive than surveying and individually geocoding every address. However, compiling and maintaining a nationwide Street Map Database is a significant undertaking. In some cases, the data is collected and entered into the Street Map Database using errorprone manual techniques, so it is not uncommon to find errors in data purchased from some Street Map Database providers. Thus, if the Street Map database contains errors, such as incorrect endpoint addresses or locations, then the results of Address Interpolation will also be inaccurate.

Figure 1:
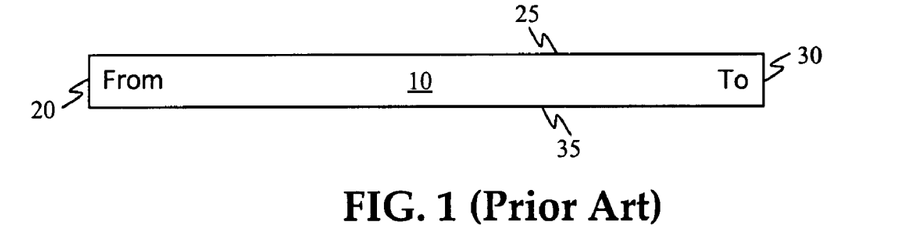
FIG. 1 illustrates an example of a street segment used in a conventional geocoding method.
Figure 2:
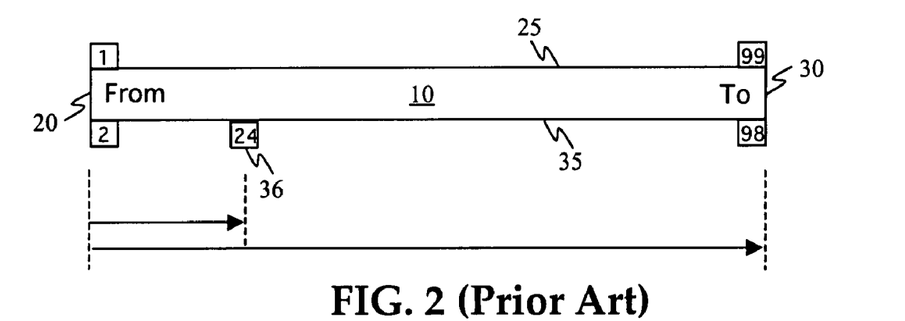
FIG. 2 illustrates the expected position of an address based on Address Interpolation, a conventional geocoding method.
Figure 3:
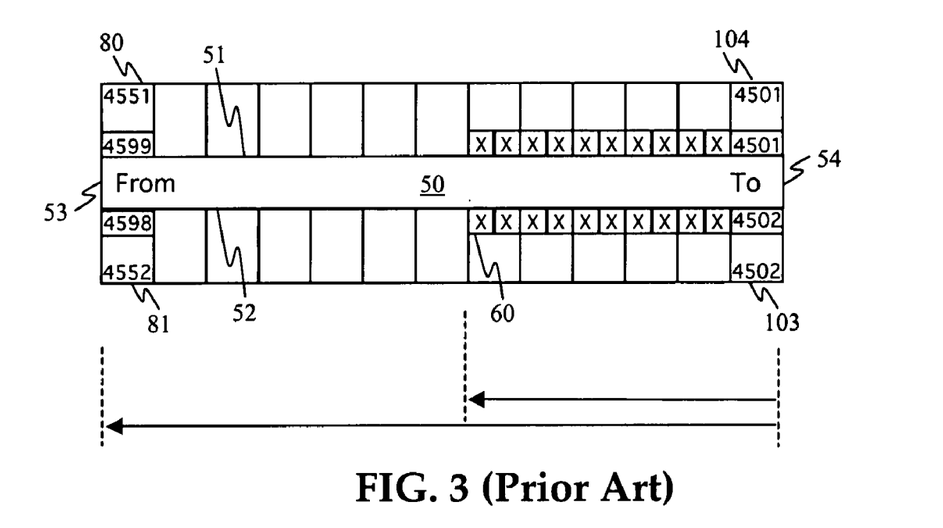
FIG. 3 illustrates the result of geocoding a section of Albuquerque, N. Mex. using conventional Address Interpolation.

The above problems with Address Interpolation will now be illustrated in more detail with reference to FIGS. 1-3. FIG. 1 illustrates an example of a street segment 10. The street segment 10 is characterized by a Start or From endpoint 20, an End or To endpoint 30, a left side 25, and a right side 35. Typically, the Start or From endpoint is the endpoint in proximity to numerical addresses that are lower than the numerical addresses in proximity to the End or To endpoint. Typically, a U.S. Street Map Database will store one range of street addresses associated with the left side of a street segment and another range of addresses with right side of a street segment. Typically, all even numbered addresses are on one side (right or left) and odd numbered addresses are on the other side.

Address Interpolation may be used to estimate a location of address number "24" on street segment 10. According to the Street Map Database, addresses on the left side 25 are odd and range from 1 to 99; addresses on the right side 35 are even and range from 2 to 98. Since 24 is even, we know the address is on the right side 35 and calculate where it falls in the interval from 2 to 98, assuming that the street segment is a straight line. Since 24 is ¼ of the way from 2 to 98, we calculate the expected position 36 of address 24 as ¼ of the way from the From endpoint 20 to the To endpoint 30. FIG. 2 illustrates the expected position of address number 24 based on Address Interpolation. Equation 1 may be used to calculate the percent displacement with respect to the To endpoint for an address on the right side of the street:

$$\frac{|RT - \text{address}|}{|RT - RF|} \times 100 = \qquad (\text{eq. 1})$$

Percent displacement of address from the To endpoint where RT is the last address in the address range on the right side of the street and RF is the first address in the address range on the right side of the street.

Alternately, equation 2 may be used to calculate the percent displacement with respect to the From endpoint for an address on the right side of the street:

$$\frac{|RF - \text{address}|}{|RT - RF|} \times 100 = \qquad (\text{eq. 2})$$

Percent displacement of address from the From endpoint

Address Interpolation estimates the specific location of an address anywhere along a street segment based on information about just the endpoints of the segment. It can yield accurate results, provided various assumptions are valid. In particular, Address Interpolation assumes that the magnitude of the address number is directly proportional to the distance traveled along the street segment; and the street segment is a straight line. Because these assumptions are not always satisfied, inaccurate results are produced. For example, when this Address Interpolation technique is applied to more complex map scenarios, it may produce unacceptable results. For example, FIG. 3 illustrates the result of geocoding a section of Albuquerque, N. Mex. using conventional Address Interpolation. Street segment 50 is a portion of Greene Avenue with a left side 51, a right side 52, a From endpoint 53, and a To endpoint 54. The crosses, such as cross 60, indicate the estimated locations of the homes/buildings. The polygons, such as polygon 81, represent the locations of the parcels, containing the homes/buildings.

In this example, the addresses on the left side 51 and a right side 52 of a street segment 50 were determined by consulting a parcel map and geocoded based on the these address ranges using Address Interpolation. Note that the addresses in this example descend from high to low along the segment. The X's on the left side 51 and a right side 52 of the street, such as X 60, represent the geocoded addresses. The true position of the outermost addresses on each side of the street are indicated by polygons 80, 81, 103 and 104. The geocoded address 60 should correspond to the polygon 81. The displacement of the geocoded address 60 from the polygon 81 suggests that these addresses were poorly geocoded.

In this case, the Street Map Database provided the following address ranges for this segment (of Greene Ave): Left side (LeftFrom=4599, LeftTo=4501) and Right Side (RightFrom=4598, RightTo=4502). In this example, while the address ranges at the To endpoint 54 of the street segment are accurate (RightTo=4502 and LeftTo=4501), the address ranges at the From endpoint 53 are not, due to an error in the database. Interpolated addresses were calculated based on displacement with respect to the To endpoint 54 of the street. This explains why address 4502 is accurately geocoded: since (|RT−4502|)/(|RF−RT|)=0, address interpolation correctly predicts address 4502 is located 0% down the segment starting at the To side, i.e., at the To side. It also explains why address 4552 is inaccurately geocoded: since (|RT−4552|)/(|RF−RT|)~½, address 4552 is incorrectly interpolated approximately halfway down the segment at X 60, even though it's true location 81 is adjacent to the From endpoint 53.

The above example illustrates how errors in the Street Map database can produce inaccurate geocodes when using Address Interpolation. It is also evident that if the street segment is curved or if the residences are not actually located right next to the street, then the geocodes generated by Address Interpolation will be inaccurate. Other sources of inaccuracies are non-uniform spacing of lots along a street segment, or non-uniform distribution of addresses along a segment.

A method for locating street addresses on a map is disclosed by Anderson in published U.S. patent application Ser. No. 0158668. According to this method, parcel polygons are extracted from parcel maps, the latitude and longitude of the parcel polygons are identified, and then the latitude-longitude couplets are cross-referenced with a property tax-related database to determine the street addresses for the parcels. The accuracy of the results may be verified by overlaying a map containing the geocoded reference points with an orthophotograph. An operator may then visually correct the map to confirm the map features, such as proper identification of the parcel boundaries and the presence and the exact location of structures. This method, however, suffers from the disadvantage that it requires the explicit geocoding of the parcels in latitude and longitude so that the latitude and longitude values can be correlated with the APN (Assessor Parcel Number) or PIN (Parcel Identifier Number) in a property-tax related database. Furthermore, access to parcel maps and property-tax related databases containing reference latitude-longitude couplets associated with street addresses is required. The quality and format of property-tax related databases varies greatly across the United States. Because access to property-tax databases is controlled by local jurisdiction, the ability to access property tax databases is inconsistent. These inconsistencies can introduce both technical and logistical issues. For some jurisdictions, property data is available in GIS (Geographical Information System) format, typically for fee (as an example, Scottsdale, Ariz. charges $38,000 for a citywide license to their GIS-based parcel data). For others, property data is limited to paper or raster scans and thus not usable as source for geocoding.

Accordingly, there is a need for geocoding methods that obviate one or more of the above shortcomings and disadvantages.

SUMMARY OF THE INVENTION

It is an object of the invention to provide improved methods for geocoding street addressable entities. In one embodiment of the invention, a geocoding method includes identifying from orthorectified imagery a set of locations of entities associated with each side of a street segment. The identified locations are then ordinally numbered with respect to positions along each side of the street segment. The method further includes determining a set of street addresses associated with each side of the street segment, and associating the identified locations with the determined street addresses to produce geocoded street addresses for each side of the street segment.

In the above embodiment, the street addresses may be determined, for example, by consulting a Street Map database to obtain a range of possible addresses associated with each side of the street segment and by then consulting a database of mailable addresses, such as a Post Office Database, or other databases of mailable addresses that act as proxies to a Post Office Database, including for instance, a Situs Address Database, to obtain the street addresses from this range information. A mailable address that refers to a physical entity is called a Situs Address. A database of Situs addresses is called a Situs Address Database. This type of mailable address database can be licensed or purchased from various database marketing bureaus. The range of possible addresses typically comprises a range of even addresses and a range of odd addresses. The street addresses typically comprise a list of odd addresses on the street segment and a list of even addresses on the street segment. The locations of the entities may be identified from the orthorectified imagery, for example, by selecting centroids associated with entity image features, and associating the centroids with the street segment. The centroids may be selected by extracting the entity image features and calculating the centroids from the extracted entity image features. The identified locations may be associated with the determined street addresses, for example, by matching, on each side of the street segment, the ordinal numbering of the identified locations with a natural order of the determined street addresses. The association between the identified locations and street addresses may also include other techniques such as, for example, consulting an entity registry database identifying multi-unit buildings in the street segment and associating multiple street addresses with identified locations corresponding to multi-unit buildings. If there is not a one-to-one matching between the identified locations and the determined street addresses, then the method may include redefining the street segment to include multiple adjacent segments. The method may further include adding the geocoded street addresses to a database if there is a one-to-one matching between the identified locations and the determined street addresses.

According to another embodiment of the invention, a method for geocoding includes obtaining a linearly ordered set of entity geocodes associated with a side of a street segment, obtaining a linearly ordered set of entity addresses associated with the side of the street segment, and associating the entity geocodes with the entity addresses by a linearly ordered matching.

In this embodiment, the obtaining of the linearly ordered entity geocodes may comprise, for example, receiving a set of entity geocodes associated with the side of the street segment, where each entity geocode potentially represents an addressable entity, and linearly ordering the received entity geocodes to produce the linearly ordered set of entity geocodes. In addition, the obtaining of the linearly ordered entity geocodes may also include receiving street segment data such as positional data for endpoints of the street segment. The obtaining of the linearly ordered set of entity addresses may include, for example, receiving a list of assignable addresses associated with the street segment and linearly ordering the list. In addition, it may also include associating the list with the street segment by receiving address range direction data and street segment side data. The associating of the entity geocodes with the entity addresses may be performed based on one or more criteria such that the assigning is consistent with address range direction data and street segment side data. The assigning may also include, for example, producing for each side of the segment a one-to-one correspondence between the numerical ordered list of assignable addresses and the linear ordered set of entity geocodes. The list of assignable addresses may be retrieved from a Situs Address Data Source.

Optionally, the received set of geocodes associated with a street segment may be supplied according to the following process. An aerial or satellite image is correlated with a street map data source containing street segment data. A target street segment represented in the aerial or satellite image and the street map data source is identified and street map data is retrieved. Potentially street addressable entities are identified in the aerial or satellite image based on the characteristic image features of street addressable entities. The set of potentially street addressable entities are implicitly or explicitly geocoded. This optional process makes use of a street map database. However, typically, the data relied upon from the street map database is limited to data required by the Situs Address Database to retrieve the list of assignable addresses on the street segment.

Optionally, the accuracy of geocoding may be improved by applying an address registration technique. Multi-unit buildings, addressable entities with multiple buildings, landmarks and/or addressable entities with known addresses may be registered in a registration database. In some cases, this registration database may be used to pre-assign addresses to addressable entities with known addresses before addresses are assigned to other addressable entities.

Advantageously, embodiments of the current invention may be used with explicit, implicit, locally unique and/or globally unique geocodes.

According to embodiments of the current invention, the use of address interpolation techniques is not required to geocode entities. However, optionally, various embodiments of the current invention may use address interpolation as part of the method for geocoding some entities.

According to one embodiment of the current invention, confidence intervals may be assigned to indicate the degree of confidence in a particular geocode, set of geocodes, address assignment or set of address assignments.

Optionally, when a poor quality address match is suspected, additional techniques may be used. For example, an alternate street segment may be considered using one or more known addresses from the optional registration database as endpoints; multiple contiguous street segments forming a large street segment containing the target street segment may be considered and addressed together based on the endpoint data of the large street segment; revalidation of assignment of endpoint entities may be carried out with a view to correcting complementary excess or shortage of entities between intersecting street segment sides, such as in cases where, for example, the target street segment side has one extra addressable entity and an intersecting street segment side has a shortage of exactly one addressable entity; or revalidation of street segment direction and/or side data may be carried out with a view to correcting complementary excess or shortage of entities between the two sides of a street segment or, alternate address assignment techniques such as address interpolation may be used.

Embodiments of the current invention may be implemented wholly or in part as computer-implemented methods. For example, various embodiments of the current invention may be implemented on a network enabled computer system.

The invention and various specific aspects and embodiments will be better understood with reference to the following drawings and detailed descriptions. For purposes of clarity, this discussion refers to devices, methods, and concepts in terms of specific examples. However, the invention and aspects thereof have applications to a variety of other types of devices and systems.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

DETAILED DESCRIPTION

The following definitions provide a clear and definite interpretation of various terms used in the context of the present description.

Geocoding—Globally Unique and Locally Unique, Implicit and Explicit

A geocode is a code that specifies a single geographical position of some entity. Geocoding is the process that assigns a geographical position, such as a pair of latitude-longitude coordinates, to some entity or, equivalently, to a unique identifier of such an entity (e.g., a street address, intersection, region name, or landmark name). Entities are buildings, structures, lots, properties, or other geographical regions. In some cases, large regions may be geocoded. For example, a zip code region, uniquely identified by its zip+4 code, may be geocoded based on the geographic position of the centroid of the zip code region. Similarly, when a house is geocoded, a single position somewhere in or near the house is selected and associated with a unique identifier, such as a street address, for the house.

In addition to latitude-longitude coordinates, geographic positions may be indicated based on a variety of systems such as, but not limited to: Universal Transverse Mercator (UTM), military UTM, and the State Plane Coordinate (SPC) System. Some geocodes are globally unique, describing a unique location on Earth, such as geocodes based on latitude and longitude. Other geocodes may be locally unique, describing a unique position within a limited region, such as local x-y coordinates for a specific map.

Implicit geocoding is a process that specifies a geocode relative to one or more known explicit geocodes, known as reference geocodes. For example, a street endpoint may be explicitly geocoded by assigning it a global geocode (such as latitude and longitude values) or a local geocode (such as x-y coordinates with respect to a specific map). A particular house on the street then may be implicitly geocoded by specifying a displacement vector from the explicitly geocoded street endpoint to a point on the map where the house is located. In this example, the explicitly geocoded street endpoint serves as a reference geocode, and the displacement vector serves as the implicit geocode for the house. The displacement vector may be specified, for example, by providing a direction and a magnitude. The direction may be provided by a second reference geocode (e.g., a second street endpoint) and the magnitude may be provided by a fraction of the distance between the first and second reference geocodes (e.g., the length of the street segment). For example an image feature on a map may be geocoded by specifying that it is 20% of the way along a street segment measuring from one street segment endpoint (a first reference geocode) to another street segment endpoint (a second reference geocode). In these examples, the actual latitude and longitude values for the implicitly geocoded house need not be calculated or measured. It should be noted that reference geocodes may be locally unique geocodes. Furthermore, it is envisioned that a reference geocode may be implicitly geocoded with respect to another, known explicit geocode. Advantageously, embodiments of the current invention may be used with implicit, explicit, locally unique and/or globally unique geocodes.

Addressable Entities

An addressable entity is a physical structure or region that may be identified using a street address. Examples of street addressable entities include, but are not limited to: houses, empty lots, buildings, apartments, apartment buildings, condominiums, building complexes and landmarks. Street addressable entities also include various associated structures or physical features such as, for example, garages, roofs, solar panels, solar heaters, air conditioners, skylights, driveways, vehicles, fences, sheds, patios, decks, docks, pools, diving boards, hot tubs, statuettes, satellite dishes, tennis courts, trampolines, bushes, shrubs, grass, trees, gardens, and landscaping. A street addressable entity may be a compound street addressable entity composed of multiple constituent entities. For example, an estate that includes a house, garage, pool, driveway, tennis court, patio, driveway, and extensive landscaping may be regarded as a single street addressable entity. Such a compound street addressable entity may be used in place of, or in addition to, its constituent entities.

A street addressable entity may also be an implied street addressable entity. For example, the detection of a large heat exhaust in an image captured in thermal infra-red spectrum, may imply the existence of heat-releasing entity, such as an air conditioner, although an air conditioner may not itself be directly observed in the image. Similarly, for example, detection of a heat sink in an image captured in thermal infra-red spectrum may imply the existence of a cooler entity such as areas where water may have leaked or seeped. As a further example, a condition of vegetation in a yard, whether healthy or stressed, as observed in a multi-spectral image by observing reflection of certain wavelengths of radiation, is also a street addressable entity.

A street addressable entity may be geocoded by specifying an associated map position. For example, the centroid of an empty lot, home, building, or region may be used as a geocode for these addressable entities. In some cases, street addressable entities may be identified using polygons, such as for instance parcel maps, and/or aerial or satellite images. Typically, parcel maps may be used to identify property lines for properties, including commercial properties and empty lots. In some cases, polygons may be used to identify boundaries of certain addressable entities and to calculate their areas and/or perimeters. Alternately, some street addressable entities may be identified using aerial or satellite imagery. For example, a satellite image of a suburban neighborhood may contain recognizable image features such as driveways and rooftops. In some cases, a potential list of street addressable entities may be produced based on the analysis of aerial or satellite images. For example, a list may be generated by identifying all of the rooftops in a neighborhood and then assuming that each rooftop represents a single street addressable entity. However, depending on the techniques used, the list generated from aerial or satellite images alone may not be completely accurate. For example, in a neighborhood with condominiums, some rooftops may represent two or more street addressable entities; due to poor weather conditions, some portions of the neighborhood may not be visible in the aerial or satellite image.

Street Segment

A street segment is defined to be a portion of a street. A street segment may span several blocks of a street and be as long as the entire length of that street. A street segment may also refer to a span that is less than the distance from one intersection to the next intersection. Furthermore, a street segment does not necessarily have endpoints at intersections. None, one or both of the endpoints of a street segment may coincide with intersections. Some commercial Street Map Data Bases may operate based on street segments that range from intersection to intersection, spanning only one block. However, in the context of this description, the definition of street segment is not limited to such one-block segments.

Situs Address Data Source

A situs address is a physical address, such as a mail delivery address of a physical property. A number of sources exist for obtaining or deriving situs address data including, for example, commercial database vendors that provide databases of mailable addresses including, for example, proxy data for post office addresses. Preferably, a situs address data source may return a list of street addresses based on a query with data identifying a street segment or a portion of a street segment. For example, a query may request only addresses located on the right or left side of a specified street segment. In such cases, the street segment is typically specified by its endpoint addresses. For example, a street segment endpoint may be specified by a street name and an address number. In some cases, additional information may be required to uniquely specify a street segment endpoint. For example, a zip code may be used to differentiate 101 Main Street in Santa Clara, Calif. from 101 Main Street in Mountain View, Calif. Alternately, a street segment endpoint may be specified using geocodes such as latitude and longitude. Other information, such as a street intersection or landmark name may be used to specify street segment endpoints. For example, the situs address data source may be queried for all addresses on Payne Street in Mountain View, Calif. bounded by the intersection of Payne Street and Main Street on one side and the intersection of Payne Street and Broad Street on the other side. Alternately, the situs address data source may be queried for all addresses bounded by the intersection of Payne Street and Main Street on one side and the Mountain View Central Post Office on the other side. Preferably, the situs address data source provides high quality, validated street addresses.

Street Map Data Source

A Street Map Data Source provides data related to specified street segments. Typically, the Street Map Data Source can provide the following data related to a specified street segment: a first (or From) address for a left side of the street, a first (or From) address for a right side of the street, a last (or To) address for a left side of the street segment, a last (or To) address for a right side of the street segment, a geocode for the From street segment endpoint, and a geocode for the To street segment endpoint. Usually, the From endpoint addresses are numerically smaller than the To endpoint addresses. However, in some cases, the From endpoint addresses may be numerically larger than the To endpoint addresses. In either case, this information implicitly identifies the address range direction for the street segment (whether increasing or decreasing). In some cases, the address range direction for the street segment may be explicitly provided. The Street Map Data Source may explicitly or implicitly provide street side addressing data indicating which side of the street segment (e.g., left or right) has even-numbered addresses and which side of the street has odd-numbered addresses. In some cases, street segments may not have consistent even/odd numbering on opposite sides (i.e., the segment may have a mixed numbering scheme). This may also be indicated in the Street Map Data Source. Typically, the geocodes are represented in latitude and longitude values; however, alternate geocodes may be used, including explicit or implicit and locally unique or globally unique geocodes.

Method for Geocoding

Figure 4:
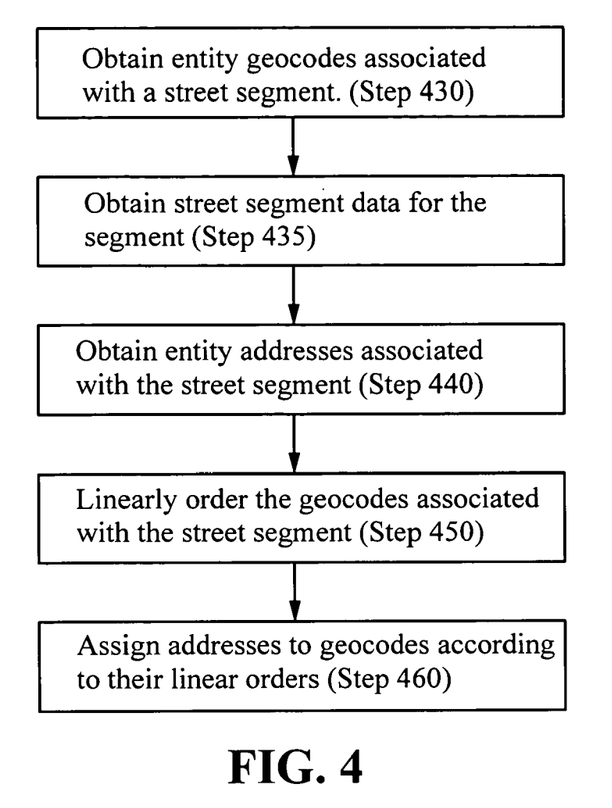
FIG. 4 is a flowchart of a method for ordering and assigning geocodes according to one embodiment of the current invention.

FIG. 4 is a flowchart of a geocoding method according to one embodiment of the current invention. The process begins when a set of geocodes associated with a specified street segment are received (Step 430). The set of geocodes represent potentially street addressable entities. These geocoded entities are not yet identified by addresses. For example, the set of geocodes may be positions on a map corresponding to image features that represent houses, empty lots or buildings that might have addresses on the street segment. Examples of positions on a map that may be used to represent a house or building include, but are not limited to: the position of the centroid of the lot and the position of the centroid of the building. In some cases, a single geocode may represent multiple street addressable entities. For example, this may be the case with a large office building or apartment complex. This case may be handled using optional techniques such as a registration technique, as will be discussed later. The geocodes are not necessarily ordered when they are received. However, the received geocodes are preferably categorized as geocodes associated with the first (or right) side of the street and geocodes associated with the second (or left) side of the street. In the event that the geocodes are not so classified, techniques may be used to classify them. For example, they may be classified using an image processing technique that compares each geocode location with the street segment line or curve to determine on which side of the line or curve the geocode is positioned.

The received set of geocodes corresponds to potentially addressable entities. Although it is preferable that these potentially addressable entities correspond to actual addressable entities, this is not necessarily the case. For example, some of the received geocodes may not correspond to actual street addressable entities associated with the street segment, or, they may correspond to several street addressable entities associated with the segment. Additionally, geocodes for some actual street addressable entities associated with the street segment may be absent. For these reasons, additional steps may be taken to correct the received geocodes. In some cases, one or more geocodes may be rejected or added. Preferably, the geocodes may be globally unique, explicit geocodes. However, it is envisioned that locally unique or globally unique, implicit or explicit geocodes may be used. The geocodes may be received in a variety of different ways, depending on their source. For example, in some cases, the geocodes may be provided in a file, database or list and may be transmitted over a network. In some embodiments, the geocodes are received from a part of the method that computes the geocodes from other data sources, as will be described later.

The process continues when street segment data is received (Step 435), e.g., from a Street Map Data Source. Street segment data may include: (1) positional street segment data such as, for example, geocodes for the street segment endpoints, and possibly additional data which may specify a shape of the street segment, such as geocodes for intermediate points; (2) address range direction data for the street segment indicating, for example, the street segment endpoint associated with relatively low numbered addresses on the segment and/or the street segment endpoint associated with relatively high numbered addresses on the segment; and (3) optionally, street segment side data indicating which side of the street segment is expected to have even numbered addresses and/or which side of the street segment is expected to have odd numbered addresses. In some cases, the street segment data may be supplied from a variety of sources. For example, optionally, a street map database may provide some or all of this information. Positional information may be two geocodes indicating the endpoints of the street segment, assumed to be straight. Preferably, however, enough data to describe a curve representing the street is provided. If such data is desired but not provided, various image processing techniques may be used to compute the segment position data from other sources of data, such as aerial imagery.

The process continues when a set of assignable addresses associated with the street segment is received (Step 440). For example, the assignable addresses may be retrieved from a Situs Address Data Source. Typically, a Situs Address Data Source may be queried for a set of assignable addresses based on the addresses or geocodes of the street segment endpoints. However, a variety of other street segment identifiers may be used depending on the organization of the specific assignable address data source and available street segment data. For example, in some cases, the positional information received in Step 435 may be used to configure a Situs Address Data Source query. Preferably, the set of assignable addresses are received in two sets, each set pre-sorted in numerical order: one set associated with the even-numbered side of the street and one set associated with the odd-numbered side of the street. However, it is envisioned that in some cases, the assignable addresses may not be sorted in numerical order and/or grouped into odd and even sets. In this case, they may be easily ordered and/or grouped. In some cases, the street segment side data for identifying which side of the street segment is expected to have even-numbered addresses and/or which side of the street segment is expected to have odd-numbered addresses may be provided by the Situs Address Data Source instead of or in addition to street segment side data provided in Step 435.

The process continues when the set of geocodes is linearly ordered based on one or more ordering criteria to create an ordered set of geocodes associated with the street segment (Step 450). The geocodes also may be grouped according to street segment side if not already so grouped. For example, the street segment side determination may be made using the geocodes and the positional information associated with the street segment. Then, the geocodes may be broken up into two sets: a first subset corresponding to the left side of the street and a second subset corresponding to the right side of the street. Furthermore, using the geocodes and the positional information associated with the street segment, the relative positions of the geocodes along the length of the street may be determined. Preferably, the primary ordering criteria is the linear distance of the geocode along the length of the street segment. Preferably, the ordering is done one each side. In some cases, different and/or additional ordering criteria may be used. For example, in cases where key lots are expected, the additional criteria of a set-back distance or the distance from the geocode to the street segment may be used to order two geocodes with nearly identical positions along the length of the street segment.

The process continues when at least one assignable address from the set of assignable addresses associated with the street segment is assigned to one of the ordered set of geocodes associated with the street segment (Step 460). Preferably, an attempt is made to create a one-to-one correspondence between assignable addresses and geocodes on each side of the street segment. In the ideal case, the number of assignable addresses associated with the street segment will match the number of geocodes in the ordered set. Preferably, the ordered addresses are assigned to the ordered geocodes by performing a linear matching whose direction is determined according to the address range direction data. The matching is performed on each side of the segment, odd numbered addresses are assigned to geocodes associated with one side of the street and even numbered addresses are assigned to geocodes associated with the other side of the street, where the appropriate sides are matched using the street segment side orientation data and the grouping of the geocodes on the two sides of the segment. Preferably, addresses are assigned from the lowest numbered address to the highest numbered address, or vice versa, according to the address range direction.

Additional Optional Steps

Figure 5:
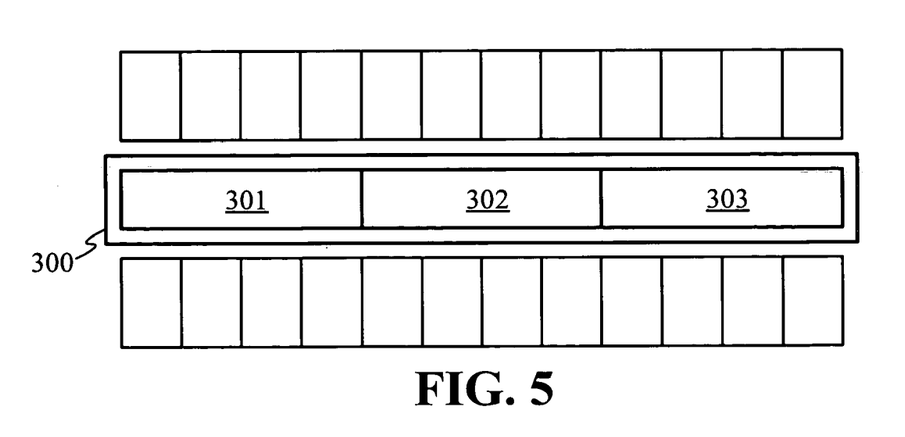
FIG. 5 illustrates a long street segment comprised of three smaller street segments, according to the teachings of an embodiment of the present invention.

In some cases, the number of geocodes received in Step 430 may not be the same as the number of assignable addresses received in Step 440. In this case, there will not be a one-to-one correspondence between addresses and entities, and the ordinal matching would result in one or more unmatched entities or addresses. Thus, in some embodiments of the invention the associating of the entity geocodes with the entity addresses may comprise a step of detecting and correcting such matching errors. For example, in some cases, a long street may contain a street segment with inaccurate data, resulting in a matching error for that segment. This matching error might be corrected by merging segments into a single larger segment and attempting the ordinal matching on this larger portion of the street. FIG. 5 illustrates a long street segment 300 comprised of three smaller street segments 301, 302 and 303. For example, Street Map Data Source may provide inaccurate data related to street segment 302. However, the overall data for segment 300 may be accurate. This could happen if the address ranges associated with segments 301, 302 and 303 were incorrectly divided between the segments, but the overall address range for street segment 300 was correct. For example, if the number of assignable addresses associated with street segment 302 is not the same as the number of geocodes received in Step 430, an attempt to assign addresses based on the larger street segment 300 may be made. In other words, the street segment to be geocoded may be redefined to be a combination of several subsegments. In another example, two adjacent segments may have opposite matching errors, i.e., the number of excess addresses on a first segment is equal to the number of excess entities on a second segment adjacent to the first. In this case, the matching errors might be corrected by assigning the excess addresses from the first segment to the excess entities of the second segment, i.e., transferring the excess addresses from the first segment to the set of addresses for the second segment, then performing the ordinal matching for each of the segments. One common instance of this type of error arises when an entity located at an intersection was associated with a first street and the second street is the intersecting street. In yet another example, the matching error may arise due to an error in the street side information. In this case, correcting the matching error may comprise of switching the addresses between right and left sides of the segment. In other cases, matching errors can be corrected by other automated techniques, such as accessing an entity registry that catalogs entities with multi-unit buildings, or multi-building entities (i.e., compound entities). Each of the above automated techniques may be used in combination with the others, and in some cases may be accompanied by manual validation if desired.

Figure 6:
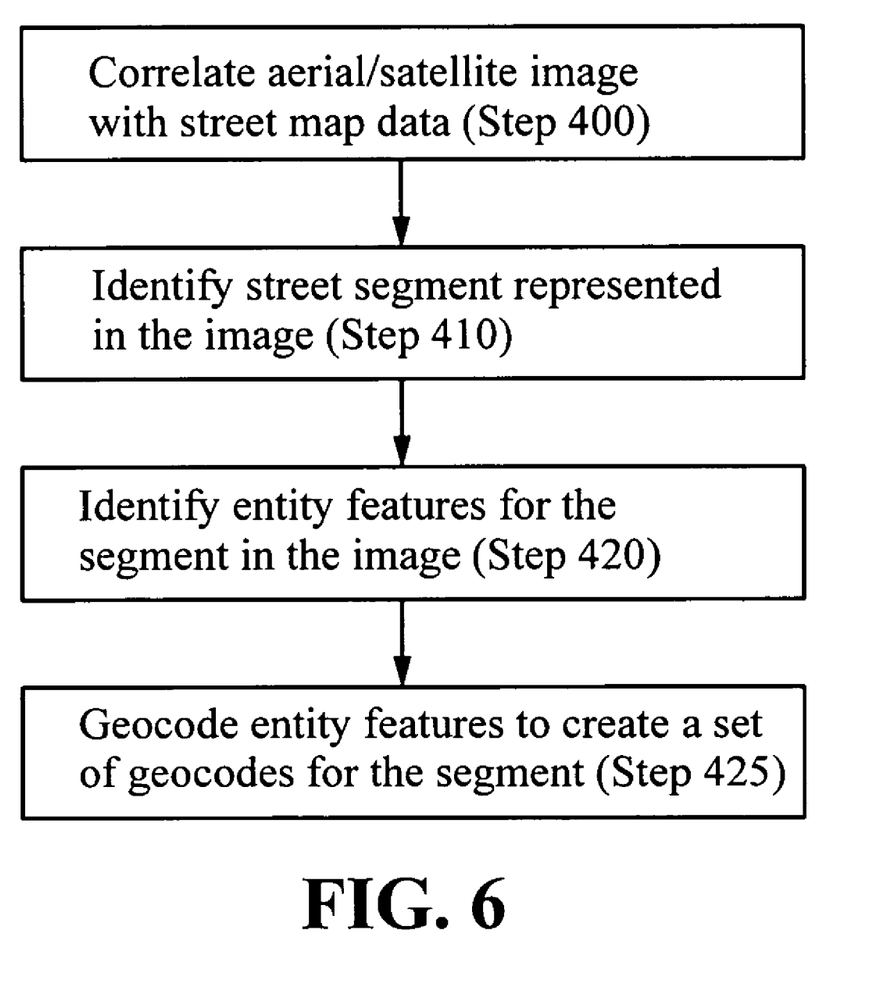
FIG. 6 is a flowchart illustrating optional steps that may be used in conjunction with various embodiments of the current invention.

One or more optional steps may supplement the flowchart illustrated in FIG. 4. For example, FIG. 6 is a flowchart illustrating some optional steps that may be used in conjunction with one embodiment of the current invention. Optionally, the geocodes received in Step 430 may be derived from an aerial or satellite image. For example, in optional Step 400 an aerial or satellite image may be correlated with data from a street map data source. Preferably, the aerial or satellite image is an orthophotograph, a georeferenced orthophotograph, a Digital Orthophotograph (DOP) or Digital Orthographic Quarter Quads (DOQQ) or a multi-spectral image. However, other aerial and/or satellite images may also be used depending on their quality and the accuracy required. The image may represent radiation in one or more of various wavelengths of light such as, for example, the visual spectrum, near-infrared spectrum, ultra-violet spectrum, or microwave spectrum. Different wavelengths can be useful for various purposes. For example, near-infrared images may be useful for identifying turf conditions or buildings with poor insulation or ventilation. Microwave images can be useful for identifying entities that use wireless networking. Such attributes of entities may be identified and associated with addressable entities.

Correlating an aerial or satellite image with data from a Street Map Data Source enables positions of image features such as streets and structures in the aerial or satellite image to be geocoded. In optional Step 410, a street segment represented in the aerial or satellite image is identified. Based on optional Steps 400 and 410, positional information about the street segment is now available. Preferably, this positional information is provided to the method of FIG. 4 in Step 435. In optional Step 420, image elements in the aerial or satellite image are identified based on the characteristic image features of street addressable entities and associated with the identified street segment. For example, in a housing development, the characteristic image features of a street addressable entity may include aerial views of rooftops and driveways. In some cases, this step may be executed by a person looking at the image and identifying rooftops. However, preferably, automated image processing and analysis techniques are primarily used and possibly supplemented by manual techniques. In optional Step 425, identified image elements may be geocoded to create a set of geocodes representing a set of potentially street addressable entities associated with the street segment.

Optionally, the accuracy of street address assignment may be improved by accessing a database registry of certain addressable entities such as, but not limited to: multi-unit buildings, and properties with multiple buildings. A condominium where a single rooftop covers two or more addressable entities is an example of a multi-unit building. A private home with a separate garage, pool house and/or mother-in-law unit is an example of a property with multiple buildings. Errors related to multi-unit buildings and properties with multiple buildings may be common when geocodes are determined by computer analysis of aerial or satellite images without the benefit of a registry of such entities.

Accordingly, in some cases it is valuable to use an optional registration database storing data such as, but not limited to: property type, number of buildings, number of address(es), known address(es), geocode, source of information, and/or confidence interval. By making an optional registration database available to various processes related to address assignment, registered addresses may be used to improve address assignments. For example, they may be used to improve the matching, or may be used as street segment endpoints to supplement segment endpoint data from a Street Map Data Source. In cases where the number of geocodes received in Step 430 is not the same as the number of assignable addresses received in Step 440, the registration database may be consulted for known addresses on the street segment or on adjacent street segment. If such an address is available, the street segment may be subdivided (perhaps on just one side of the street) into two subsegments which share an endpoint at the known address from the registration database. If subdivided segments still do not provide acceptable matching, other techniques, such as address interpolation, may be applied to the sub-segments. Alternately, a registration database may be used to identify street segments with multi-unit dwellings and flag them, helping to identify results that are likely to contain errors. Such errors may then be corrected, if desired, using operator-assisted techniques or more sophisticated algorithms.

Optionally, it may be useful to assign a confidence interval to the results of an address assignment. For example, in the case where the number of geocodes received in Step 430 is not the same as the number of assignable addresses received in Step 440, there may be a low degree of confidence in subsequent address assignments. Furthermore, when aerial or satellite images are used, the quality of the image may be a consideration. For example, in some cases, assigning a low optional confidence interval to the results of an address assignment may flag the results for closer inspection by an expert.

An Exemplary Embodiment

Figure 7:
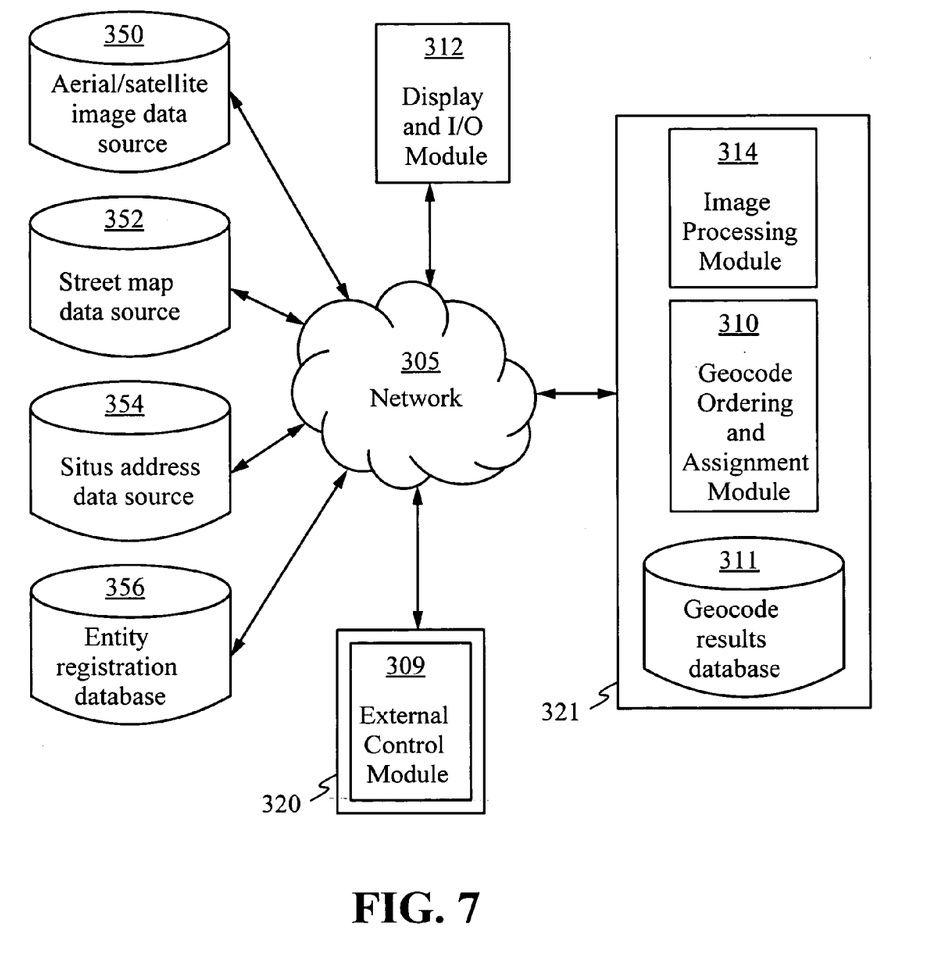
FIG. 7 illustrates an embodiment of the current invention, implemented as a software module.

The following discussion illustrates the application of an exemplary embodiment of the current invention to the problem of address assignment on a portion of Greene Street in Albuquerque, N. Mex. FIG. 7 illustrates a system 310, within which an embodiment of the invention may be implemented as a software module. In this example, a Geocode Ordering and Assignment Module 310 is implemented in software running on a network-enabled computer 321 coupled to network 305. Image Processing Module 314 and Results Database 311 are external to module 314, but run on the same hardware platform 321. In this example, External Control Module 309, operating on networked hardware platform 320, manages the input and output to module 314 as well as the process flow for other modules. An optional display and I/O module 312 may be a networked workstation where results or intermediate results may be viewed and/or an operator may provide input. Networked data sources such as Aerial Image Data Source 350, Street Map Data Source 352, Situs Address Data Source 354 and Registration Data Source 356 are also illustrated.

Initially, the Control Module 309 receives an aerial or satellite image from the Aerial or Satellite Image Data Source 350 over a network 305. In this example, the aerial or satellite image may be displayed on a computer monitor (display and I/O) 312 to an operator who selects a street segment for address assignment. Alternately, this step may be executed automatically by another module. The control module 309 consults a Street Map Data Source 352 for street map data corresponding to the portion of the aerial or satellite image containing the street segment. In this case, geocodes corresponding to the From street segment endpoint and To street segment endpoint are retrieved from the Street Map Data Source, providing the address range direction data. In addition, the odd side of the street segment and the even side of the street segment are identified based on data from the Street Map Data Source 352, providing the street side orientation data. Although the address ranges may be retrieved from the Street Map Data Source 352, these address ranges are not necessarily required to obtain valid assignable addresses. The control module 309 correlates the aerial or satellite image with the data received from the Street Map Data Source 352. In this example, the Street Map Data Source 352 provides geocodes for the endpoints of the street segment, enabling explicit and/or implicit geocoding of other positions in the aerial or satellite image. An image-processing module 314 receives the aerial or satellite image from the control module 309 and processes it, identifying image elements based on the characteristic image features of street addressable entities near the street segment.

Figure 8:
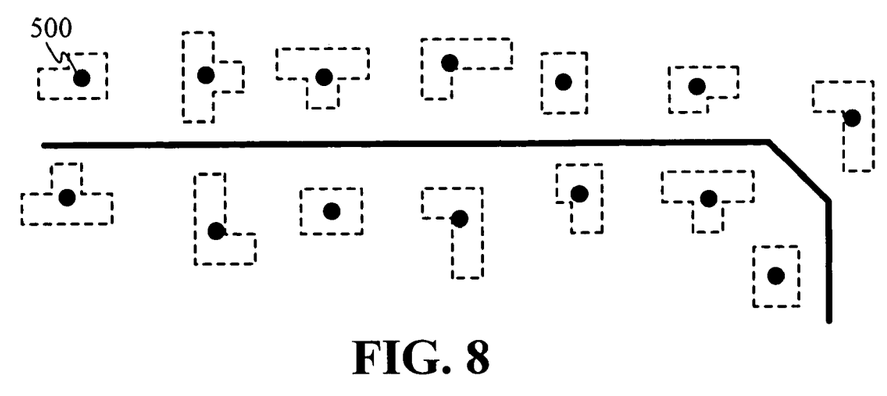
FIG. 8 illustrates the results of image processing the aerial or satellite image according to one embodiment of the present invention.

FIG. 8 illustrates the results of image processing the aerial or satellite image. In this example, rooftop-shaped features were identified and their centroids calculated and then geocoded based on the correlation of the aerial or satellite image with the Street Map Data Source. Black circles in FIG. 8 indicate centroids, such as geocoded centroid 500. Based on their positions with respect to the side of the street segment, the geocoded centroids may be divided into two sets: a set of geocoded centroids associated with the even side of the street segment and a set of geocoded centroids associated with the odd side of the street.

Figure 9:
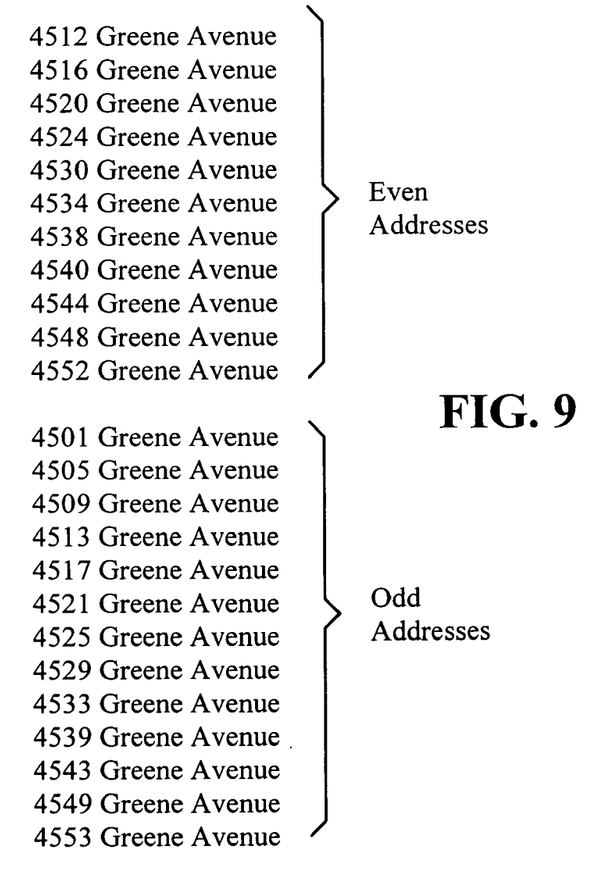
FIG. 9 illustrates an example of a segmented list according to one embodiment of the invention.

Returning again to FIG. 7, the control module 309 retrieves a list of assignable addresses from the Situs Address Data Source 354 based on the geocodes of the street segment endpoints. In this example, the list is segmented into two subsets representing addresses assignable to the odd side of the street and addresses assignable to the even side of the street; each subset is in numerical order. FIG. 9 illustrates an example of this segmented list. Ideally, the number of assignable addresses is the same as the number of geocoded centroids, for each side of the street segment. In this case, the primary ordering criterion is the linear distance of the centroids along the length of the street segment. This linear distance can be calculated in various ways. For example, it may be calculated to be the distance along the street segment from the segment endpoint to a point where the street segment intersects with a normal line through the centroid, i.e., a line perpendicular to the street segment and passing through the centroid. In the case of centroids offset from a curved street, the distance may be calculated along a replica of the street segment, where the replica runs parallel to the segment but is offset from the street segment. The offset may be determined by calculating the shortest distance from the centroid to the actual street segment and then displacing the endpoint of the segment replica from the actual segment endpoint by the same distance and direction. The linear distances along the length of the street segment are calculated for each of the geocoded centroids, and the centroids on each side of the street are ordered based on these relative positions. In some cases, the precise positions of the geocoded centroids with respect to the street segment may be calculated in order to determine the relative positions of the geocoded centroids with respect to the length of the street segment. However, alternate calculations may be done to determine the relative positions of the geocoded centroids with respect to the length of the street segment without requiring exact calculation of their positions along the length of the street segment. For each side of the street, the centroids are ordered and assignable addresses are assigned in numerical order to the ordered list of centroids consistent with the address range direction, the street segment side orientation and the side. In this example, the results of address assignment may be stored in Results Database 311.

Figure 10:
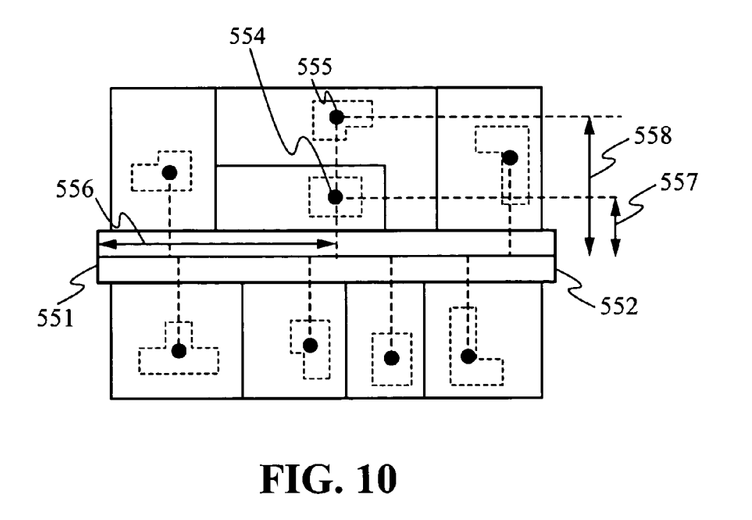
FIG. 10 illustrates an example of a street segment where one of the addressable entities is a key lot, according to an embodiment of the invention.

In some cases, a secondary ordering criteria may be used. For example, FIG. 10 illustrates an example of a street segment where one of the addressable entities is a key lot. In this example, geocoded centroids 554 and 555 have the same displacement (indicated by double headed arrow 556) along the length of the street segment bounded by street segment endpoints 551 and 552. A variety of techniques may be used to determine the proper order for these centroids. For example, in some embodiments, a human operator may be notified and asked to make a decision regarding the proper order in cases where the ordering criterion based on the linear position alone is not sufficient to determine an ordering automatically. In some cases, additional ordering criteria may be used to attempt to automatically determine an ordering. For example, the lateral displacement of the centroids with respect to the street segment may be used as part of the ordering technique. In this case, the double-headed arrow 557 indicates the lateral displacement for geocoded centroid 554; double-headed arrow 558 indicates the lateral displacement for geocoded centroid 558.

Figure 11:
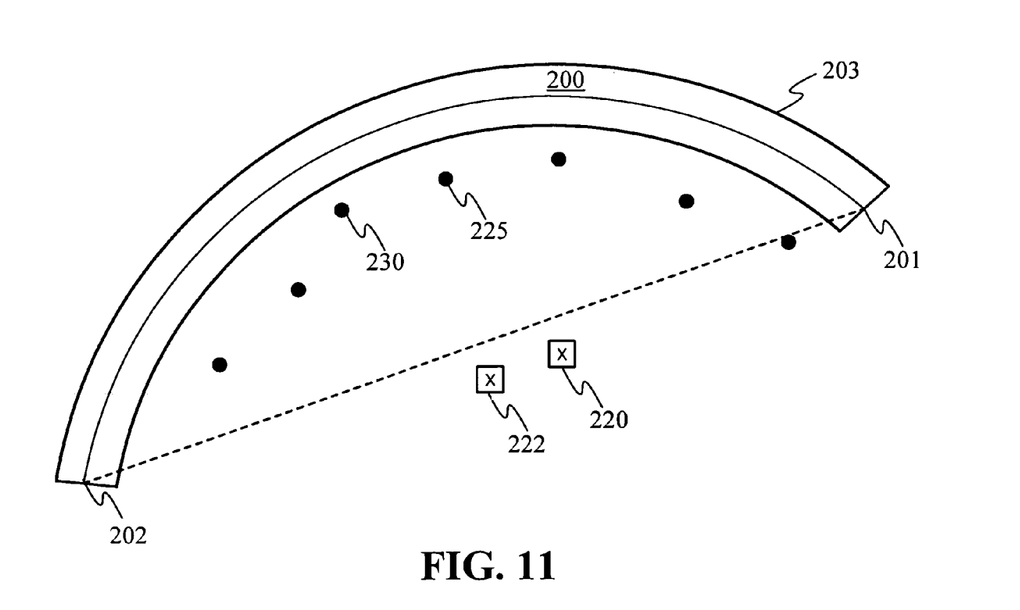
FIG. 11 illustrates an example of a curvy street segment 200 with associated geocoded centroids indicated by black circles according to an embodiment of the invention.

FIG. 11 illustrates an example of a curvy street segment 200 with associated geocoded centroids indicated by black circles. Consider an address range of 100 to 170 associated with the right 203 side of the street, a Start street segment endpoint 201 and an End street segment endpoint 202 received from a Street Segment Database, and assignable addresses 100 Wave Street, 110 Wave Street, 120 Wave Street, 130 Wave Street, 140 Wave Street, 150 Wave Street, 160 Wave Street and 170 Wave Street received from a Situs Address Database. Various embodiments of the current invention would associate the address 140 Wave Street with geocoded centroid 225; similarly, address 150 Wave Street would be associated with geocoded centroid 230. In comparison, a simple prior art Address Interpolation geocoding method would incorrectly geocode 140 Wave Street with position 220; similarly, it would incorrectly geocode 150 Wave Street with position 222.

Thus, in contrast with prior geocoding techniques, embodiments of the present invention provide methods to generate roof-top accuracy geocodes for a high percentage of street segments without using parcel maps. Of course, if parcel maps are available, they may be used to potentially improve the percentage of accurately geocoded entities. Depending on the end use application of the geocode database, different levels of accuracy will be required. For example, while a very high accuracy is required for E-911 applications, lower accuracies can be tolerated in applications such as insurance and direct marketing.

Although the embodiment described above in relation to FIG. 7 is implemented as a single software module 310 and operates on a single network-enabled computer 321, an alternate embodiment of the current invention may be distributed across multiple hardware platforms and/or software modules. In some cases, one or more of the steps or substeps used in the technique may be executed by hardware, firmware, software and/or manually.

Also, according to this example embodiment described above, optional Image Processing module 314 and Results Database 311 co-exist and operate on the same hardware platform 321 as module 310 whereas other modules and data sources exist and/or operate remotely, accessible over a network. However, it is envisioned that in an alternate embodiment of the current invention, some, none, or all of the optional modules and external modules may co-exist and operate on the same computer, or be variously distributed on multiple networked computers. Remote Data Sources and modules may be interconnected in a variety of ways, depending on the technology used. For example, the Aerial Image Data Source 350 may be housed in a filing cabinet, with aerial or satellite images retrieved manually and scanned into a file that is transmitted to the hardware platform 321 over an intermittent dial-up connection. In some cases, one or more people may the geocode ordering step and/or address assignment step may be performed using operator assistance.

Advanced Image Processing and Analysis Techniques

It is envisioned that various image-processing and/or analysis techniques may be integrated with embodiments of the current invention to improve and/or extend functionality. For example, in a previous example, rooftop-shaped features were identified from an aerial or satellite image by an image-processing module. In that example, the centroids of the rooftop-shaped features were calculated and then geocoded. Alternately, a more sophisticated image processing module may identify polygons defining the borders of buildings or the footprints of the buildings and then calculate the centroids of these polygons. These polygons may be used to provide additional useful information. For example, if the application is related to property tax calculations, estimates of building square footage may help identify unregistered buildings and/or building additions.

Image processing techniques can provide other types of valuable information as well. For example, in the case of a compound entity with associated constituent entities, the constituent entities may be identified and used as attributes of the compound entity. In other words, properties may be identified that have a particular attribute. For example, if the goal is to identify the addresses of people owning in-ground and aboveground pools greater than a certain size, image analysis techniques can be used to extract pool shaped features from aerial or satellite images. These pools could then be associated with the closest building and the two considered a compound entity with the attribute of having a pool. In addition, it should be emphasized that if this type of feature extraction process is performed to identify pools, then the extraction of centroids for associated homes or buildings in order to obtain rooftop-accurate geocodes can be performed with minimal additional computational overhead.

Sophisticated image processing techniques can be integrated with embodiments of the current invention to automate the process of feature extraction and centroid generation. Some other times, semi-automated image processing techniques may be used along with operators to identify centroids from aerial or satellite images. Even in cases where only manual image processing techniques are employed, the most operator-intensive part of the image processing and/or analysis techniques which may be integrated with embodiments of the current invention is identifying the centroids from the aerial images. But this is a relatively easy thing to do. On the other hand, to place parcel maps in a GIS is almost 20 times more time consuming since it requires the operator to overlay the parcel maps onto the aerial images, sketch the boundaries, associate the textual attributes. Thus, even without sophisticated image processing techniques to automate the feature extraction, the present method enjoys great advantages over existing geocoding techniques, both in accuracy and efficiency.

The foregoing described embodiments of the invention are provided as illustrations and descriptions. They are not intended to limit the invention to precise form described. In particular, the Applicants contemplate that functional implementation of invention described herein may be implemented equivalently in hardware, software, firmware, or other available functional components or building blocks.

What is claimed is:

1. A geocoding method comprising
identifying from orthorectified imagery locations of entities associated with each side of a street segment;
ordinally numbering the identified locations with respect to positions along each side of the street segment;
determining street addresses associated with each side of the street segment; and
associating the identified locations with the determined street addresses to produce geocoded street addresses for each side of the segment;
wherein associating the identified locations with the determined street addresses comprises matching, on each side of the street segment, the ordinal numbering of the identified locations with a natural order of the determined street addresses; and, if there is not a one-to-one matching between the identified locations and the determined street addresses, then redefining the street segment to include multiple adjacent segments.

2. The method of claim 1 wherein determining street addresses comprises:
consulting a Street Map database to obtain a range of possible addresses associated with each side of the street segment; and
consulting a Situs Address database to obtain the street addresses.

3. The method of claim 2 wherein the range of possible addresses comprises:
a range of even addresses; and
a range of odd addresses.

4. The method of claim 1 wherein the street addresses comprise:
a list of odd addresses on the street segment and
a list of even addresses on the street segment.

5. The method of claim 1 wherein the identifying locations of entities comprises:
selecting centroids associated with entity image features, and
associating the centroids with the street segment.

6. The method of claim 5 wherein selecting centroids comprises extracting the entity image features and calculating the centroids from the extracted entity image features.

7. The method of claim 1 further comprising adding the geocoded street addresses to a database if there is a one-to-one matching between the identified locations and the determined street addresses.

8. The method of claim 1 wherein associating the identified locations with the determined street addresses comprises:
consulting an entity registry database identifying multi-unit buildings in the street segment and
associating multiple street addresses with identified locations corresponding to multi-unit buildings.

9. A geocoding method comprising:
obtaining a linearly ordered set of entity geocodes associated with a side of a street segment;

obtaining a linearly ordered set of entity addresses associated with the side of the street segment; and associating the entity geocodes with the entity addresses by a linearly ordered matching, thereby geocoding the entity addresses;

wherein obtaining the linearly ordered set of entity geocodes comprises:

obtaining a set of entity geocodes associated with the side of the street segment, where each entity geocode potentially represents an addressable entity, and linearly ordering the received entity geocodes to produce the linearly ordered set of geocodes;

wherein linearly ordering the received entity geocodes comprises calculating intersection points between the street segment and lines drawn perpendicular to said street segment to said entity geocodes.

10. The method of claim 9 wherein obtaining the set of entity geocodes associated with the side of the street segment comprises identifying image features of an aerial or satellite image and correlating the image features with street segment data from a street map data source.

11. The method of claim 10 wherein identifying image features of an aerial or satellite image comprises identifying street segments and potentially addressable entities.

12. The method of claim 9 wherein linearly ordering the received entity geocodes comprises:

calculating intersection points between the street segment and lines drawn perpendicular to said street segment to said entity geocodes; and assigning a linear order to the intersection points based on distances along the street segment from an endpoint of the street segment to the intersection points.

13. The method of claim 9 wherein obtaining the linearly ordered set of entity geocodes comprises receiving street segment data for endpoints of the street segment.

14. The method of claim 9 wherein obtaining the linearly ordered set of entity addresses comprises receiving a list of assignable addresses associated with the street segment and linearly ordering the list.

15. The method of claim 14 wherein obtaining the linearly ordered set of entity addresses comprises associating the list with the street segment by receiving address range direction data and street segment side data.

16. The method of claim 9 wherein associating the entity geocodes with the entity addresses is performed in accordance with address range direction data and street segment side data.

17. The method of claim 9 wherein associating the entity geocodes with the entity addresses comprises producing for each side of the segment a one-to-one correspondence between a numerical order of the list of entity addresses and the linear order of the linearly ordered set of entity geocodes.

18. The method of claim 9 wherein associating the entity geocodes with the entity addresses comprises accessing a entity registry database comprising multi-unit buildings and multi-building entities.

19. The method of claim 9 wherein associating the entity geocodes with the entity addresses comprises redefining the street segment.

20. The method of claim 9 wherein associating the entity geocodes with the entity addresses comprises transferring at least one of the entity addresses to an adjacent street segment.

21. The method of claim 9 wherein associating the entity geocodes with the entity addresses comprises switching the addresses between right and left sides of the segment.

22. A geocoding method comprising:

obtaining a list of entity geocodes associated with a side of a street segment;

ordinally numbering the list of entity geocodes with respect to position on the street segment;

obtaining an ordered list of entity addresses associated with the side of the street segment; and associating the entity geocodes with the entity addresses by an ordinal matching, thereby geocoding the entity addresses; wherein associating the entity geocodes with the entity addresses comprises switching the addresses, as appropriate, between right and left sides of the segment.

23. The method of claim 22 wherein ordinally numbering the list of entity geocodes comprises calculating intersection points between the street segment and lines drawn perpendicular to the street segment to the entity geocodes.

24. The method of claim 23 wherein ordinally numbering the list of entity geocodes further comprises assigning a linear order to the calculated intersection points based on distances along the street segment from an endpoint of the street segment to the calculated intersection points.

25. The method of claim 22 wherein obtaining the list of entity geocodes associated with the side of the street segment comprises identifying image features of an aerial or satellite image and correlating the image features with street segment data from a street map data source.

26. The method of claim 22 wherein obtaining the list of entity geocodes comprises receiving street segment data for endpoints of the street segment.

27. The method of claim 22 wherein obtaining the ordered list of entity addresses comprises receiving a list of assignable addresses associated with the street segment and linearly ordering the list.

28. The method of claim 22 wherein obtaining the ordered list of entity addresses comprises associating the ordered list with the street segment by receiving address range direction data and street segment side data.

29. The method of claim 22 wherein associating the entity geocodes with the entity addresses is performed in accordance with address range direction data and street segment side data.

30. The method of claim 22 wherein associating the entity geocodes with the entity addresses comprises producing for each side of the segment a one-to-one correspondence between a numerical address order of the ordered list of entity addresses and the ordinally numbered list of entity geocodes.

31. The method of claim 22 wherein associating the entity geocodes with the entity addresses comprises accessing an entity registry database comprising multi-unit buildings and multi-building entities.

32. The method of claim 22 wherein associating the entity geocodes with the entity addresses comprises redefining the street segment.

33. The method of claim 22 wherein associating the entity geocodes with the entity addresses comprises transferring at least one of the entity addresses to an adjacent street segment.

34. The method of claim 22 further comprising adding the geocoded entity addresses to a database.

* * * * *